United States Patent
Wang

(10) Patent No.: US 8,207,785 B2
(45) Date of Patent: Jun. 26, 2012

(54) CHARGE PUMP CIRCUIT WITH IMPROVED RELIABILITY

(75) Inventor: Wei Wang, Taipei County (TW)

(73) Assignee: Princeton Technology Corporation, Xindian Dist., New Taipei (TW)

( * ) Notice: Subject to any disclaimer, the term of this patent is extended or adjusted under 35 U.S.C. 154(b) by 61 days.

(21) Appl. No.: 12/940,048

(22) Filed: Nov. 5, 2010

(65) Prior Publication Data

US 2011/0169559 A1    Jul. 14, 2011

(30) Foreign Application Priority Data

Jan. 12, 2010  (TW) ................ 99200575 U

(51) Int. Cl.
   *G05F 3/02*  (2006.01)
(52) U.S. Cl. ........................................ 327/536
(58) Field of Classification Search .......... None
   See application file for complete search history.

(56) References Cited

U.S. PATENT DOCUMENTS 7,741,898 B2 *  6/2010  Hsu .............................. 327/536
7,843,712 B2 * 11/2010  Lee .............................. 363/60

* cited by examiner

*Primary Examiner* — Lincoln Donovan
*Assistant Examiner* — Sibin Chen
(74) *Attorney, Agent, or Firm* — Winston Hsu; Scott Margo

(57) ABSTRACT

A charge pump circuit, including a charging capacitor, a pumping capacitor, a switch, two voltage-limiting devices, and two path-control devices, generates an output voltage by amplifying an input voltage. The charging capacitor is charged by the input voltage and discharged according to the voltage level of a node. The pumping capacitor can provide the output voltage by storing the charges transmitted from the charging capacitor. The switch controls the signal transmission path between the node and a ground terminal according to a clock signal. The first path-control device controls the signal transmission path between the input signal and the charging capacitor. The second path-control device controls the signal transmission path between the charging capacitor and the pumping capacitor.

11 Claims, 5 Drawing Sheets

CHARGE PUMP CIRCUIT WITH IMPROVED RELIABILITY

BACKGROUND OF THE INVENTION

1. Field of the Invention

The present invention is related to a charge pump circuit, and more particularly, to a charge pump circuit with improved reliability.

2. Description of the Prior Art

Commonly used in voltage boosters or voltage multipliers, a charge pump circuit is a two-terminal device which receives a low-level input voltage Vi at an input end, converts the input voltage Vi, and then outputs a high-level output voltage Vo at an output end.

Reference is made to FIG. 1 for a diagram illustrating a prior art charge pump circuit 100. The charge pump circuit 100 includes a first input switch SW1, a second input switch SW2, a first output switch SW3, a second output switch SW4, a charging capacitor C1 and a pumping capacitor C2. The first input switch SW1 is coupled between nodes N1 and N3, while the second input switch SW2 is coupled between nodes N2 and N4. The first output switch SW3 is coupled between the node nodes N3 and N5, while the second output switch SW4 is coupled between nodes N4 and N6. The charging capacitor C1 is coupled between nodes N3 and N4, while the pumping capacitor C2 is coupled between nodes N5 and N6. The charge pump circuit 100 receives the input voltage Vi at node N1 and provides the output voltage Vo at node N5, while a first ground reference voltage Vg1 and a second ground reference voltage Vg2 are respectively received at nodes N2 and N6.

During the boosting period of the prior art charge pump circuit 100, the first input switch SW1 and the second input switch SW2 are turned on, while the first output switch SW3 and the second output switch SW4 are turned off, thereby storing the charges corresponding to the voltage difference between the input voltage Vi and the first ground reference voltage Vg1 into the charging capacitor C1. Next, during the charging period of the prior art charge pump circuit 100, the first output switch SW3 and the second output switch SW4 are turned on, thereby charging the pumping capacitor C2. By appropriately adjusting the value of the second ground reference voltage Vg2, the prior art charge pump circuit 100 can generate the output voltage Vo by boosting the input voltage Vi.

The prior art charge pump circuit 100 performs voltage-boosting by switching the serial/parallel connection of two external capacitors C1 and C2, which occupy large space and add to manufacturing costs. Meanwhile, in thin oxide processes, the prior art charge pump circuit 100 has complicated circuit design and normally requires additional band-gap regulators in order to improve circuit reliability.

SUMMARY OF THE INVENTION

The present invention provides a charge pump circuit with improved reliability which generates an output voltage through amplifying an input voltage. The charge pump circuit includes a first charging capacitor which is charged by the input voltage or outputs its stored charges according to a voltage level of a first node; a pumping capacitor coupled between an input end and an output end of the charge pump circuit, wherein the pumping capacitor receives the charges from the first charging capacitor and provide the output voltage and configured to provide the output voltage by storing charges received from the first charging capacitor; a first constant voltage device coupled to the first charging capacitor and configured to provide a first bias voltage at the first node; a second constant voltage device coupled to the pumping capacitor and configured to maintain a voltage established the pumping capacitor at a second bias voltage; a first switch coupled to the first node and configured to control a signal transmission path between the first node and a third bias voltage according to a first clock signal, wherein the third bias voltage has a lower level than the first bias voltage; a first path-control device configured to control a signal transmission path between the input end of the charge pump circuit and the first charging capacitor; and a second path-control device configured to control a signal transmission path between the first charging capacitor and the pumping capacitor.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ". Also, the term "couple" is intended to mean either a direct or an indirect electrical connection. Accordingly, if one device is coupled to another device, the electrical connection may be through a direct electrical connection, or through an indirect electrical connection via other devices and connections.

Figure 1:
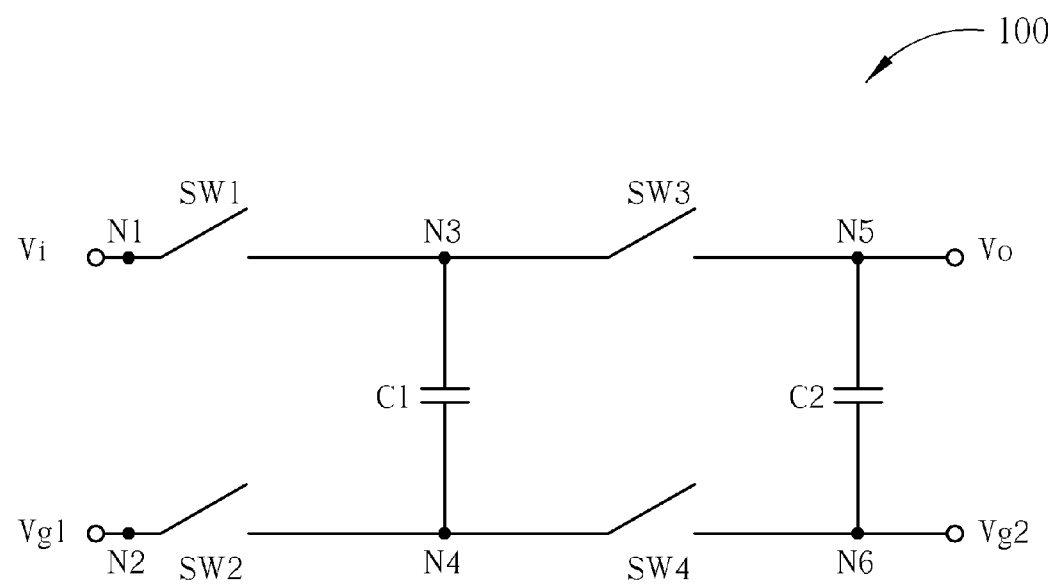
FIG. 1 is a diagram illustrating a prior art charge pump circuit.
Figure 2:
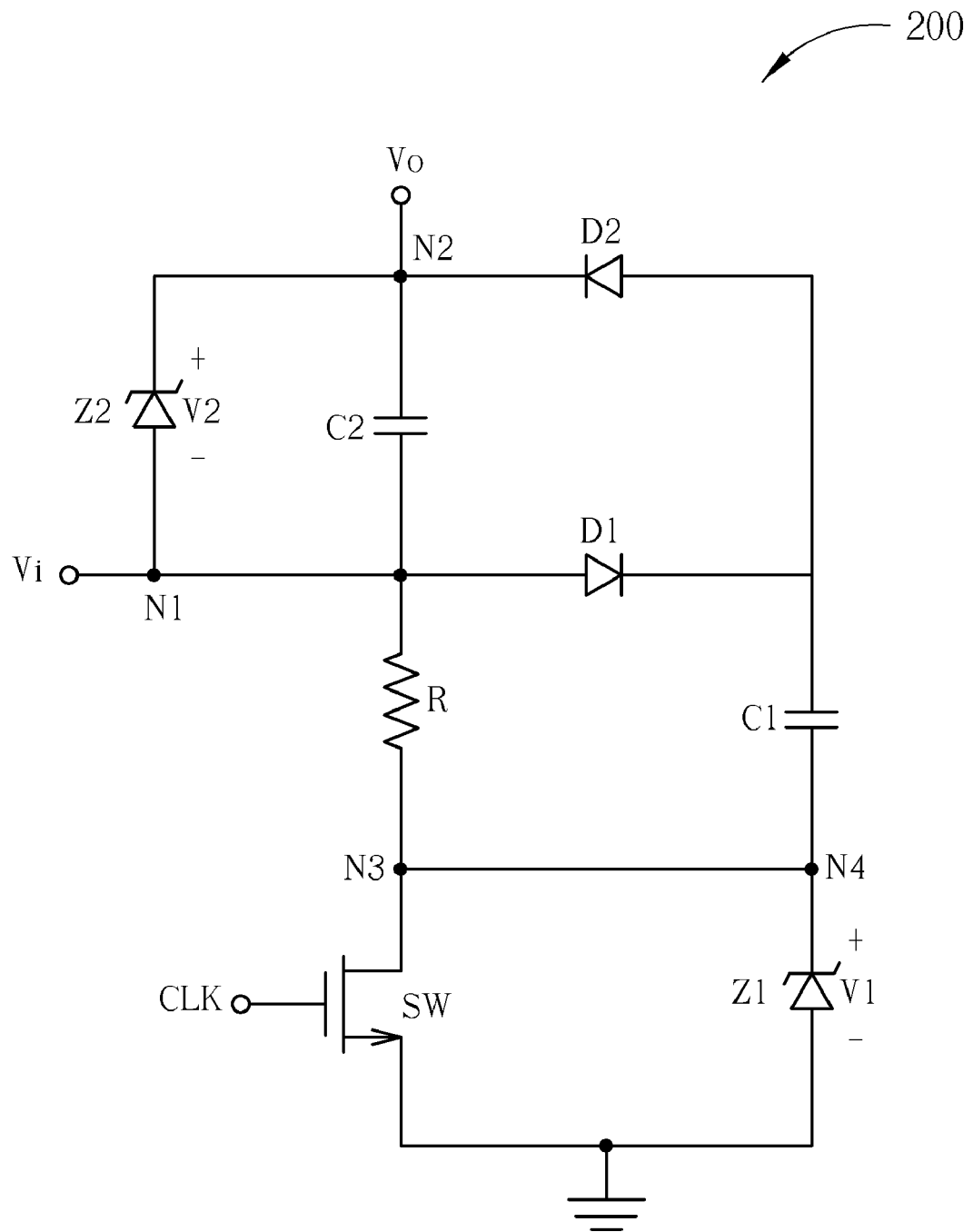
FIG. 2 is a diagram illustrating a charge pump circuit according to the first embodiment of the present invention.

Reference is made to FIG. 2 for a diagram illustrating a charge pump circuit 200 according to a first embodiment of the present invention. The charge pump circuit 200 receives a low-level input voltage Vi at node N1, converts the input voltage Vi, and provides a high-level output voltage Vo at node N2. The charge pump circuit 200 includes a switch SW, a charging capacitor C1, a pumping capacitor C2, voltage-limiting devices Z1 and Z2, path-control devices D1 and D2, and a resistor R. In order to regulate the band-gap voltage, the resistor R is configured to provide a working current for operating the voltage-limiting device Z1 so that the voltage-limiting device Z1 provides a constant pull-up voltage V1 at node N4. In order to protect back-end circuits, the voltage-limiting device Z2 is configured to set a voltage limit V2 to the maximum voltage across the pumping capacitor C2. The switch SW operates according to a clock signal CLK. During the boosting period of the charge pump circuit 200, the clock signal CLK turns on the switch SW, thereby pulling down node N3 to ground. At this time, the input voltage Vi charges the charging capacitor C1 via the path-control device D1, which also blocks the reverse charging path from the charging capacitor C1 to node N1. During the charging period of the charge pump circuit 200, the clock signal CLK turns off the switch SW, thereby pulling up node N3 to the voltage V1 established across the voltage-limiting device Z1. At this time, the charges stored in the charging capacitor C1 are transmitted to the pumping capacitor C2 via the path-control device D2, which also blocks the reverse charging path from the pumping capacitor C2 to the charging capacitor C1.

Figure 3:
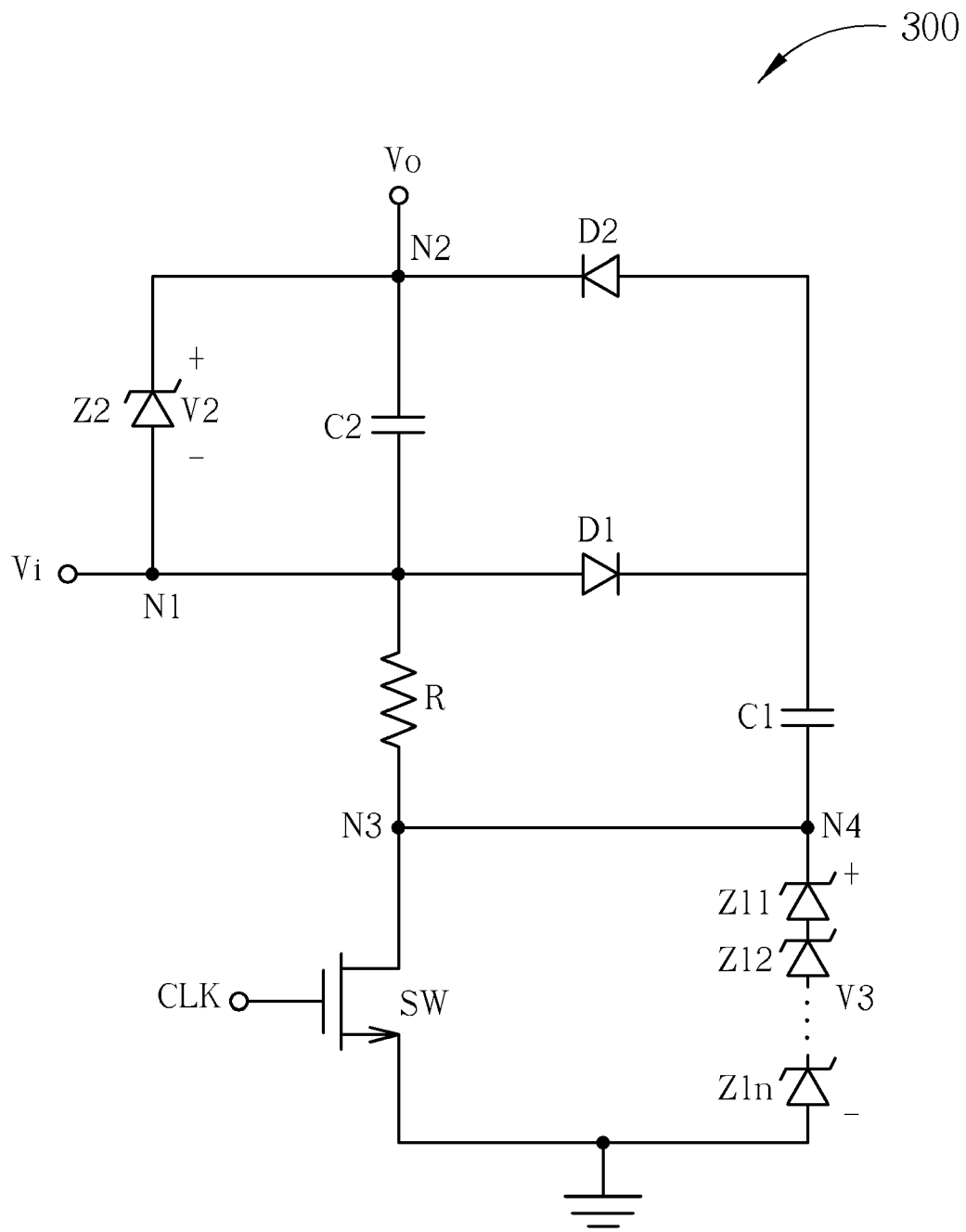
FIG. 3 is a diagram illustrating a charge pump circuit according to the second embodiment of the present invention.

Reference is made to FIG. 3 for a diagram illustrating a charge pump circuit 300 according to a second embodiment of the present invention. Having similar structures, the first and second embodiments of the present invention differ in that the charge pump circuit 300 includes a plurality of voltage-limiting devices Z11-Z1n coupled in series. Therefore, a pull-up voltage V3 higher than the pull-up voltage V1 can be provided at node N4. Since the pull-up voltage V3 is higher than the pull-up voltage V1, more charges stored in the charging capacitor C1 are transmitted to the pumping capacitor C2, thereby providing the output voltage Vo having a higher level.

Figure 4:
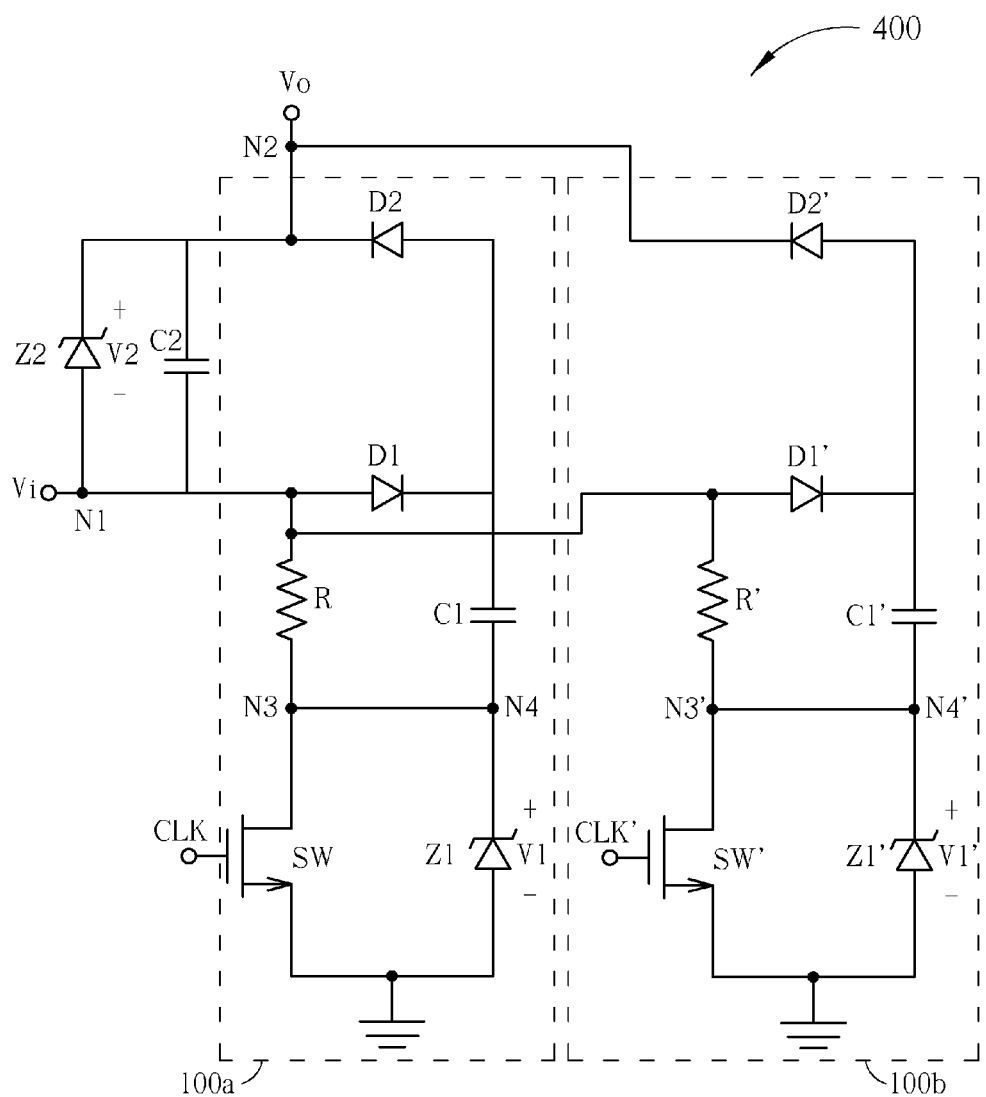
FIG. 4 is a diagram illustrating a charge pump circuit according to the third embodiment of the present invention.

Reference is made to FIG. 4 for a diagram illustrating a charge pump circuit 400 according to a third embodiment of the present invention. Having similar structures, the first and third embodiments of the present invention differ in that the charge pump circuit 400 adopts a complimentary structure based on the charge pump circuit 100. The charge pump circuit 400 according to the third embodiment of the present invention includes a first unit 100a, a second unit 100b, a pumping capacitor C2, and a voltage-limiting device Z2. The voltage-limiting device Z2 is configured to set a voltage limit V2 to the maximum voltage across the pumping capacitor C2 in order to protect back-end circuits.

The first unit 100a includes a switch SW, a charging capacitor C1, a voltage-limiting device Z1, path-control devices D1 and D2, and a resistor R. In order to regulate the band-gap voltage, the resistor R is configured to provide a working current for operating the voltage-limiting device Z1 so that the voltage-limiting device Z1 provides a constant pull-up voltage V1 at node N4. The switch SW operates according to a clock signal CLK. During the boosting period of the charge pump circuit 400, the clock signal CLK turns on the switch SW, thereby pulling down node N3 to ground. At this time, the input voltage Vi charges the charging capacitor C1 via the path-control device D1, which also blocks the reverse charging path from the charging capacitor C1 to node N1. During the charging period of the charge pump circuit 400, the clock signal CLK turns off the switch SW, thereby pulling up node N3 to the voltage V1 established across the voltage-limiting device Z1. At this time, the charges stored in the charging capacitor C1 are transmitted to the pumping capacitor C2 via the path-control device D2, which also blocks the reverse charging path from the pumping capacitor C2 to the charging capacitor C1.

The second unit 100b includes a switch SW', a charging capacitor C1', a voltage-limiting device Z1', path-control devices D1' and D2', and a resistor R'. In order to regulate the band-gap voltage, the resistor R' is configured to provide a working current for operating the voltage-limiting device Z1' so that the voltage-limiting device Z1' provides a constant pull-up voltage V1' at node N4'. The switch SW' operates according to a clock signal CLK'. During the boosting period of the charge pump circuit 400, the clock signal CLK' turns on the switch SW', thereby pulling down node N3' to ground. At this time, the input voltage Vi charges the charging capacitor C1' via the path-control device D1', which also blocks the reverse charging path from the charging capacitor C1' to node N1'. During the charging period of the charge pump circuit 400, the clock signal CLK' turns off the switch SW', thereby pulling up node N3' to the voltage V1' established across the voltage-limiting device Z1'. At this time, the charges stored in the charging capacitor C1' are transmitted to the pumping capacitor C2 via the path-control device D2', which also blocks the reverse charging path from the pumping capacitor C2 to the charging capacitor C1'.

The charge pump circuit 400 according to the third embodiment of the present invention operates according to the clock signals CLK and CLK'. The clock signals CLK and CLK' are pulse signals having opposite phases, so that the boosting period of the first unit 100a corresponds to the charging period of the second unit 100b, and the charging period of the first unit 100a corresponds to the boosting period of the second unit 100b. The charge pump circuit 400 according to the third embodiment of the present invention adopts a complimentary structure formed by the first unit 100a and the second unit 100b, thereby capable of reducing the ripple of the output voltage Vo.

Figure 5:
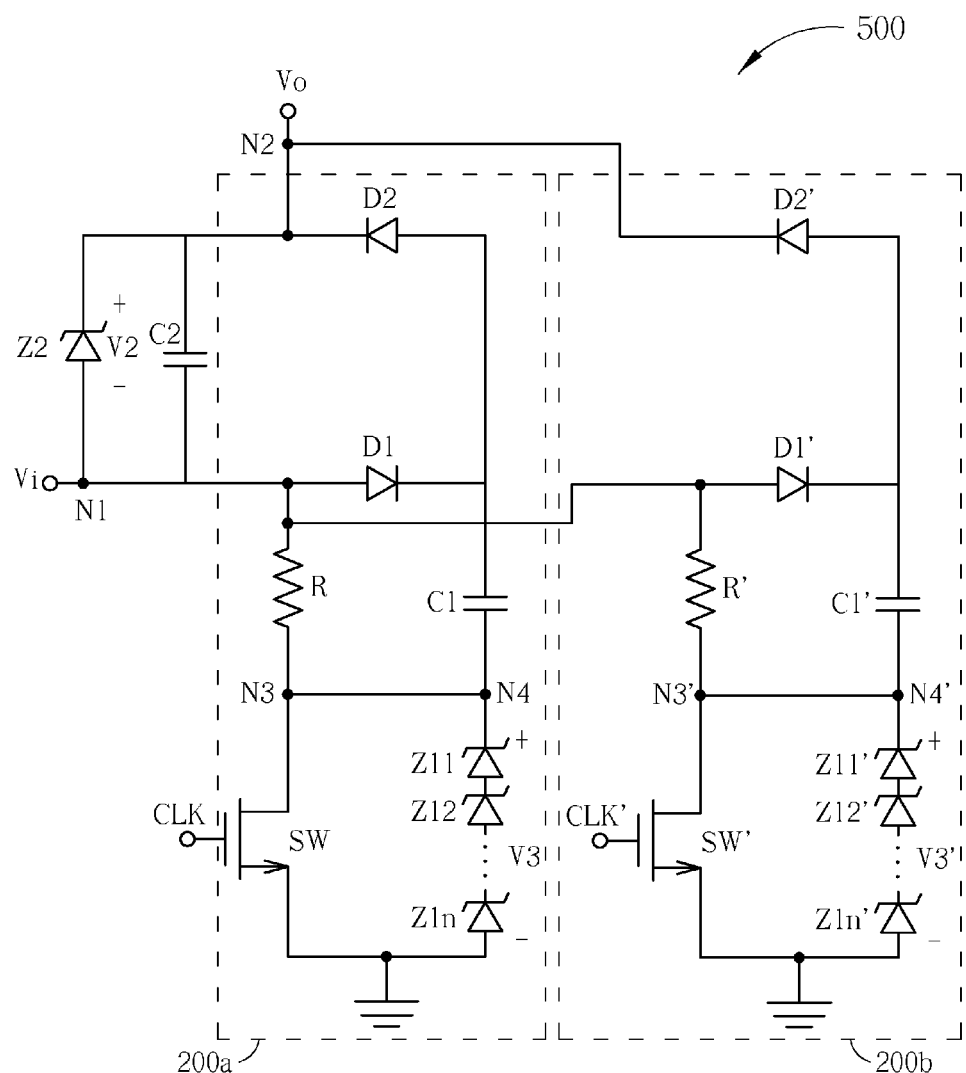
FIG. 5 is a diagram illustrating a charge pump circuit according to the fourth embodiment of the present invention.

Reference is made to FIG. 5 for a diagram illustrating a charge pump circuit 500 according to a fourth embodiment of the present invention. Having similar structures, the third and fourth embodiments of the present invention differ in that the first unit 100a of the charge pump circuit 500 includes a plurality of voltage-limiting devices Z11-Z1n and the second unit 100b of the charge pump circuit 500 includes a plurality of voltage-limiting devices Z11'-Z1n'. Therefore, the charge pump circuit 500 can provide a pull-up voltage V3 higher than the pull-up voltage V1 at node N4 and a pull-up voltage V3' higher than the pull-up voltage V1' at node N4'. Since the pull-up voltage V3 is higher than the pull-up voltage V1 and the pull-up voltage V3' is higher than the pull-up voltage V1', more charges stored in the charging capacitors C1 and C1' are respectively transmitted to the pumping capacitors C2 and C2', thereby providing the output voltage Vo having higher level.

In the charge pump circuits according to the first to fourth embodiments of the present invention, the voltage-limiting devices Z1, Z2, Z11-Z1n, Z11'-Z1n' can be Zener diodes, or other constant voltage devices providing voltage regulation. The path-control device D1, D2, D1' and D2' can be PN diodes, or other devices which are selectively short-circuited or open-circuited according to the voltage levels at both ends. The switches SW and SW' can be N-type metal oxide semiconductor field-effect (NMOSFET) transistors, or other devices with similar function. The charging capacitor C1, C1' and the pumping capacitors C2, C2 can be external capacitors, or fabricated in the same integrated circuit together with other devices of the charge pump circuit. These embodiments are only for illustrative purpose, and do not limit the scope of the present invention.

The charge pump circuit of the present invention adjusts the band-gap voltage and protects back-end circuits using the voltage-limiting devices, controls the signal transmission paths during the boosting period and the charging period using the path-control devices. Since only one transistor is required to be fabricated in thin oxide processes, the circuit design can be simplified and circuit reliability can be improved. Meanwhile, output voltage ripples can be improved by adopting a parallel structure.

Those skilled in the art will readily observe that numerous modifications and alterations of the device and method may be made while retaining the teachings of the invention.

What is claimed is:

1. A charge pump circuit with improved reliability which generates an output voltage though amplifying an input voltage, the charge pump circuit comprising:
   a first charging capacitor which is charged by the input voltage or outputs its stored charges according to a voltage level of a first node;
   a pumping capacitor coupled between an input end and an output end of the charge pump circuit, wherein the pumping capacitor receives the charges from the first charging capacitor and provide the output voltage;
   a first constant voltage device coupled to the first charging capacitor and configured to provide a first bias voltage at the first node;
   a second constant voltage device coupled to the pumping capacitor and configured to maintain a voltage across the pumping capacitor at a second bias voltage;
   a first switch coupled to the first node and configured to control a signal transmission path between the first node and a third bias voltage according to a first clock signal, wherein the third bias voltage has a lower level than the first bias voltage;
   a first path-control device configured to control a signal transmission path between the input end of the charge pump circuit and the first charging capacitor; and
   a second path-control device configured to control a signal transmission path between the first charging capacitor and the pumping capacitor.

2. The charge pump circuit of claim 1 further comprising a plurality of Zener diodes coupled in series, wherein:
   the first constant voltage device includes a first Zener diode having an anode for receiving the third bias voltage and a cathode coupled to the first node; and
   the second constant voltage device includes a second Zener diode having an anode coupled to the input end of the charge pump circuit and a cathode coupled to the output end of the charge pump circuit.

3. The charge pump circuit of claim 1 wherein:
   the first path-control device includes a first diode having an anode coupled to the input end of the charge pump circuit and a cathode coupled to the first charging capacitor; and
   the second path-control device includes a second diode having an anode coupled to the first charging capacitor and a cathode coupled to the output end of the charge pump circuit.

4. The charge pump circuit of claim 1 wherein the first switch includes an N-type metal oxide semiconductor field-effect transistor (NMOSFET) having a first end coupled to the first node, a second end for receiving the third bias voltage and a control end for receiving the first clock signal.

5. The charge pump circuit of claim 1 further comprising:
   a first resistor coupled between the input end of the charge pump circuit and the first node and configured to provide a working current for operating the first constant voltage device.

6. The charge pump circuit of claim 1 further comprising:
   a second charging capacitor which charges or discharges the input voltage according to a voltage level of a second node;
   a third constant voltage device coupled to the second charging capacitor and configured to provide a fourth bias voltage at the second node;
   a second switch coupled to the second node and configured to control a signal transmission path between the second node and a fifth bias voltage according to a second clock signal, wherein the fifth bias voltage has a lower level than the fourth bias voltage;
   a third path-control device coupled to the second charging capacitor and configured to control a signal transmission path between the input end of the charge pump circuit and the second charging capacitor; and
   a fourth path-control device coupled to the second charging capacitor and configured to control a signal transmission path between the second charging capacitor and the pumping capacitor,
   wherein the pumping capacitor receives the charge from the second charging capacitor and provides the output voltage, and wherein a level of the third bias voltage and a level of the fifth bias voltage are substantially identical.

7. The charge pump circuit of claim 6 further comprising a plurality of Zener diodes coupled in series, wherein the third constant voltage device includes a third Zener diode having an anode for receiving the fifth bias voltage and a cathode coupled to the second node.

8. The charge pump circuit of claim 6 wherein:
   the third path-control device includes a third diode having an anode coupled to the input end of the charge pump circuit and a cathode coupled to the second charging capacitor; and
   the fourth path-control device includes a fourth diode having an anode coupled to the second charging capacitor and a cathode coupled to the output end of the charge pump circuit.

9. The charge pump circuit of claim 6 wherein the second switch includes an NMOSFET transistor having a first end coupled to the second node, a second end for receiving the fifth bias voltage and a control end for receiving the second clock signal.

10. The charge pump circuit of claim 6 further comprising:
    a second resistor coupled between the input end of the charge pump circuit and the second node and configured to provide a working current for operating the third constant voltage device.

11. The charge pump circuit of claim 6 wherein the first clock signal and the second clock signal are opposite phase signals.

* * * * *